(12) United States Patent
Fukushi et al.

(10) Patent No.: US 11,008,044 B2
(45) Date of Patent: May 18, 2021

(54) VEHICLE PANEL AND MANUFACTURING METHOD THEREOF

(71) Applicant: HONDA MOTOR CO., LTD., Tokyo (JP)

(72) Inventors: Yoshinori Fukushi, Wako (JP); Kanji Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/615,496

(22) PCT Filed: Jun. 2, 2017

(86) PCT No.: PCT/JP2017/020585
§ 371 (c)(1),
(2) Date: Nov. 21, 2019

(87) PCT Pub. No.: WO2018/220816
PCT Pub. Date: Dec. 6, 2018

(65) Prior Publication Data
US 2020/0086923 A1    Mar. 19, 2020

(51) Int. Cl.
*B60R 19/34*    (2006.01)
*B62D 25/02*    (2006.01)
(Continued)

(52) U.S. Cl.
CPC .......... *B62D 25/025* (2013.01); *B62D 25/04* (2013.01); *B62D 25/06* (2013.01); *B62D 25/08* (2013.01);
(Continued)

(58) Field of Classification Search
CPC .............. A63B 71/081; B01D 21/2411; B01D 21/2427; F42B 12/40; Y02T 50/40;
(Continued)

(56) References Cited

U.S. PATENT DOCUMENTS 7,070,228 B2 * 7/2006 Shimizu ............... B62D 25/082
296/187.01
9,688,437 B1 * 6/2017 Dimer .................... B65D 85/68
(Continued)

FOREIGN PATENT DOCUMENTS

BR    112014000534-6 A2    2/2017
JP    H06-286654 A    10/1994
(Continued)

OTHER PUBLICATIONS

International Search Report by ISA/JP dated Jun. 27, 2017, on PCT/JP2017/020585 (2 pages).
(Continued)

*Primary Examiner* — Kiran B Patel
(74) *Attorney, Agent, or Firm* — Rankin, Hill & Clark LLP

(57) ABSTRACT

A panel to be arranged in a vehicle body includes a reinforcing inner panel made of metal and formed by press molding, and a thickening part to partially thicken the reinforcing inner panel by a thickening process. The reinforcing inner panel includes a first surface, a second surface, and a surface edge between the first surface and the second surface, along which the thickening part is provided.

4 Claims, 3 Drawing Sheets

(51) Int. Cl.
*B62D 25/04* (2006.01)
*B62D 25/06* (2006.01)
*B62D 25/08* (2006.01)
*B62D 25/20* (2006.01)
*B62D 27/02* (2006.01)

(52) U.S. Cl.
CPC ........ *B62D 25/2036* (2013.01); *B62D 27/023* (2013.01)

(58) Field of Classification Search
CPC ....... H01L 2924/00; H01L 2924/00014; H01L 2224/48465; H01L 2224/45015; B29C 66/71
See application file for complete search history.

(56) References Cited

U.S. PATENT DOCUMENTS

| | | | | |
|---|---|---|---|---|
| 10,081,391 | B1* | 9/2018 | Tyan | F16F 7/121 |
| 10,814,915 | B2* | 10/2020 | Onishi | B62D 25/04 |
| 2006/0284432 | A1* | 12/2006 | Hashimoto | B21D 53/88 |
| | | | | 293/154 |
| 2008/0143144 | A1* | 6/2008 | Yustick | B62D 25/025 |
| | | | | 296/187.03 |
| 2009/0096245 | A1 | 4/2009 | Sundarraj et al. | |
| 2010/0098969 | A1* | 4/2010 | Hashimura | B21J 15/025 |
| | | | | 428/653 |
| 2010/0194146 | A1* | 8/2010 | Nishimura | B62D 25/025 |
| | | | | 296/193.06 |
| 2010/0231003 | A1* | 9/2010 | Okumura | B62D 21/157 |
| | | | | 296/193.06 |
| 2011/0095567 | A1* | 4/2011 | Ishigame | B62D 21/157 |
| | | | | 296/187.03 |
| 2011/0156446 | A1* | 6/2011 | Iwase | B62D 25/145 |
| | | | | 296/193.06 |
| 2012/0119477 | A1* | 5/2012 | Kim | B60R 22/24 |
| | | | | 280/801.2 |
| 2013/0020833 | A1* | 1/2013 | Yao | B60R 22/24 |
| | | | | 296/193.06 |
| 2013/0049391 | A1* | 2/2013 | Kurogi | B62D 25/025 |
| | | | | 296/30 |
| 2014/0103685 | A1* | 4/2014 | Mani | B62D 25/145 |
| | | | | 296/193.02 |
| 2014/0147693 | A1* | 5/2014 | Yasuyama | B62D 21/157 |
| | | | | 428/594 |
| 2014/0152053 | A1 | 6/2014 | Watanabe et al. | |
| 2015/0217721 | A1* | 8/2015 | Lakic | B62D 25/04 |
| | | | | 280/801.1 |
| 2015/0344071 | A1* | 12/2015 | Nakano | B62D 25/04 |
| | | | | 296/187.09 |
| 2016/0083014 | A1* | 3/2016 | Komamura | B62D 21/152 |
| | | | | 296/187.1 |
| 2016/0083015 | A1* | 3/2016 | Kiyoshita | B62D 25/04 |
| | | | | 296/187.09 |
| 2016/0101815 | A1* | 4/2016 | Schnug | B62D 25/02 |
| | | | | 296/187.12 |
| 2016/0200361 | A1* | 7/2016 | Goto | B62D 25/088 |
| | | | | 296/203.01 |
| 2016/0221610 | A1* | 8/2016 | Nishimura | B62D 25/02 |
| 2016/0257348 | A1* | 9/2016 | Balur | B62D 27/02 |
| 2016/0297113 | A1* | 10/2016 | Burke | B32B 27/00 |
| 2016/0355214 | A1* | 12/2016 | Irie | B62D 21/157 |
| 2017/0050679 | A1* | 2/2017 | Shirooka | B62D 27/023 |
| 2017/0247071 | A1* | 8/2017 | Schneider | B62D 25/04 |
| 2017/0297631 | A1* | 10/2017 | Schneider | B62D 25/04 |
| 2017/0349216 | A1* | 12/2017 | Akhlaque-E-Rasul | B62D 29/005 |
| 2018/0237073 | A1* | 8/2018 | Kiyoshita | B62D 25/04 |
| 2019/0111974 | A1* | 4/2019 | Takayanagi | B62D 25/04 |
| 2019/0233019 | A1* | 8/2019 | Walch | B62D 21/157 |
| 2019/0263451 | A1* | 8/2019 | Nakamoto | B62D 25/02 |
| 2019/0276088 | A1* | 9/2019 | Onishi | B62D 25/04 |
| 2019/0283805 | A1* | 9/2019 | Kurokawa | B62D 29/005 |
| 2020/0108781 | A1* | 4/2020 | Kataoka | H04R 1/025 |
| 2020/0307695 | A1* | 10/2020 | Tanaka | B62D 25/20 |
| 2020/0317273 | A1* | 10/2020 | Nishimura | B62D 25/04 |
| 2020/0317276 | A1* | 10/2020 | Nishimura | B62D 25/04 |
| 2020/0324825 | A1* | 10/2020 | Han | B60R 22/24 |

FOREIGN PATENT DOCUMENTS

JP 2003-112260 A 4/2003
JP 3852733 B2 12/2006

OTHER PUBLICATIONS

Written Opinion by ISA/JP dated Jun. 27, 2017, on PCT/JP2017/020585 (3 pages).
Office Action received in corresponding BR application No. BR112019024605-3 dated Jan. 02, 2021 with English ranslation (11 pages).

* cited by examiner

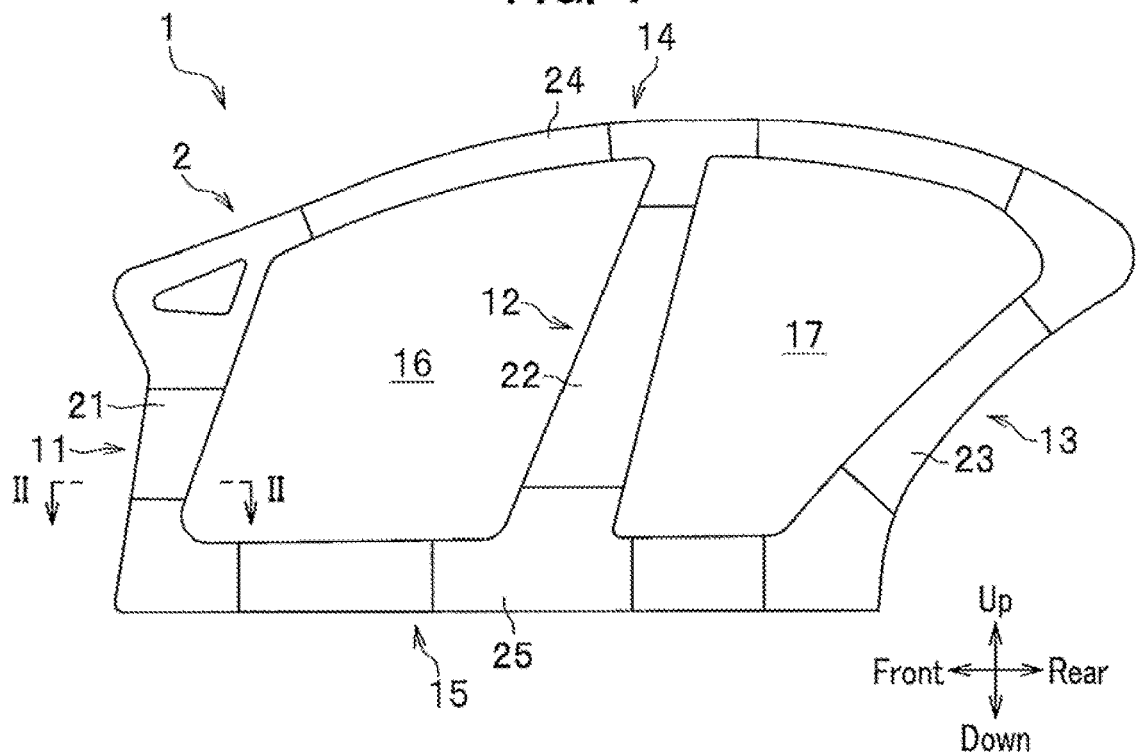
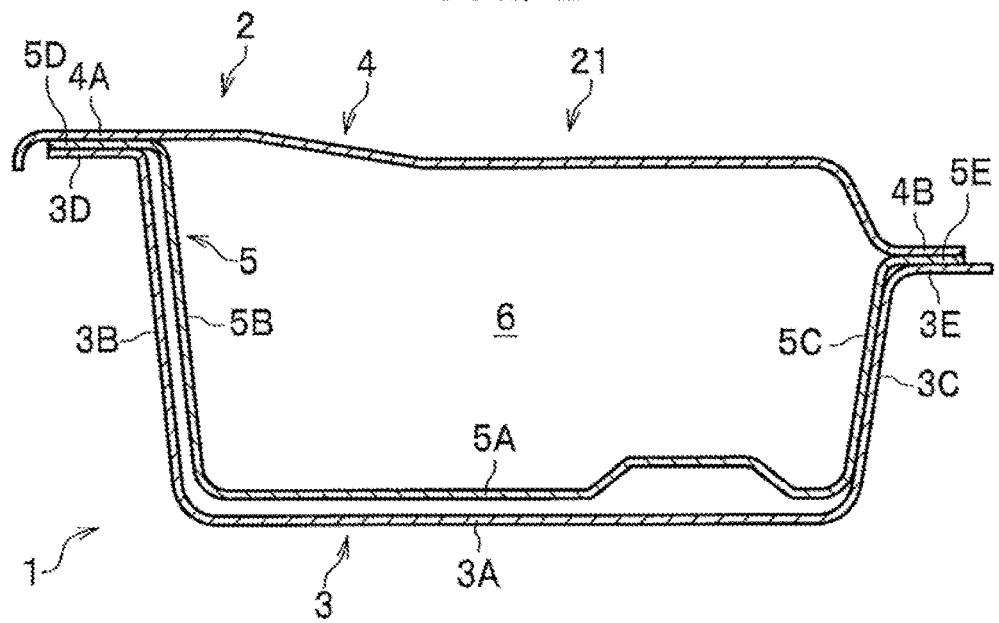

VEHICLE PANEL AND MANUFACTURING METHOD THEREOF

TECHNICAL FIELD

The present invention relates to a panel of a vehicle such as an automobile and a manufacturing method thereof.

BACKGROUND ART

There is a technique of reinforcing a vehicle body panel of an automobile, as described in Japanese Patent No, 3852733. Japanese Patent No. 3852733 discloses a technique of providing a door hinge reinforcing member at a corner, between a front pillar and a side sill, of an opening in a side body outer panel. The door hinge reinforcing member is composed of a plate-shaped panel member, and is overlappingly attached by spot welding to the door hinge panel mounted to the inner surface of the side body outer panel.

SUMMARY OF THE INVENTION

Problems to be Solved

The technique of Japanese Patent No. 3852733 requires the panel for reinforcement to have a certain level of size and thickness for gaining a predetermined reinforcing capability, to have a problem of the vehicle body likely having an increased weight.

The present invention has been invented to solve such problems, and is intended to provide a vehicle panel and a manufacturing method thereof that gain a desired reinforcing capability while the vehicle body being suppressed from having an increased weight.

Solution to Problem

The present invention provides a panel that is arranged in a vehicle body, and includes: a main body made of metal and formed by press molding; and a thickening part to partially thicken the main body by a thickening process, to solve the above-identified problem.

Advantageous Effects of the Invention

The present invention allows for easily thickening only a portion or portions of the panel requiring reinforcement by a thickening process, to suppress the vehicle body from having an increased weight as compared with a structure of another press-molded panel being overlappingly attached for reinforcement.

BRIEF DESCRIPTION OF DRAWINGS

FIG. 1 is a side view of a side panel;
FIG. 2 is a cross-sectional view of the side panel taken along a line II-II in FIG. 1.

EMBODIMENTS OF THE INVENTION

Figure 3:
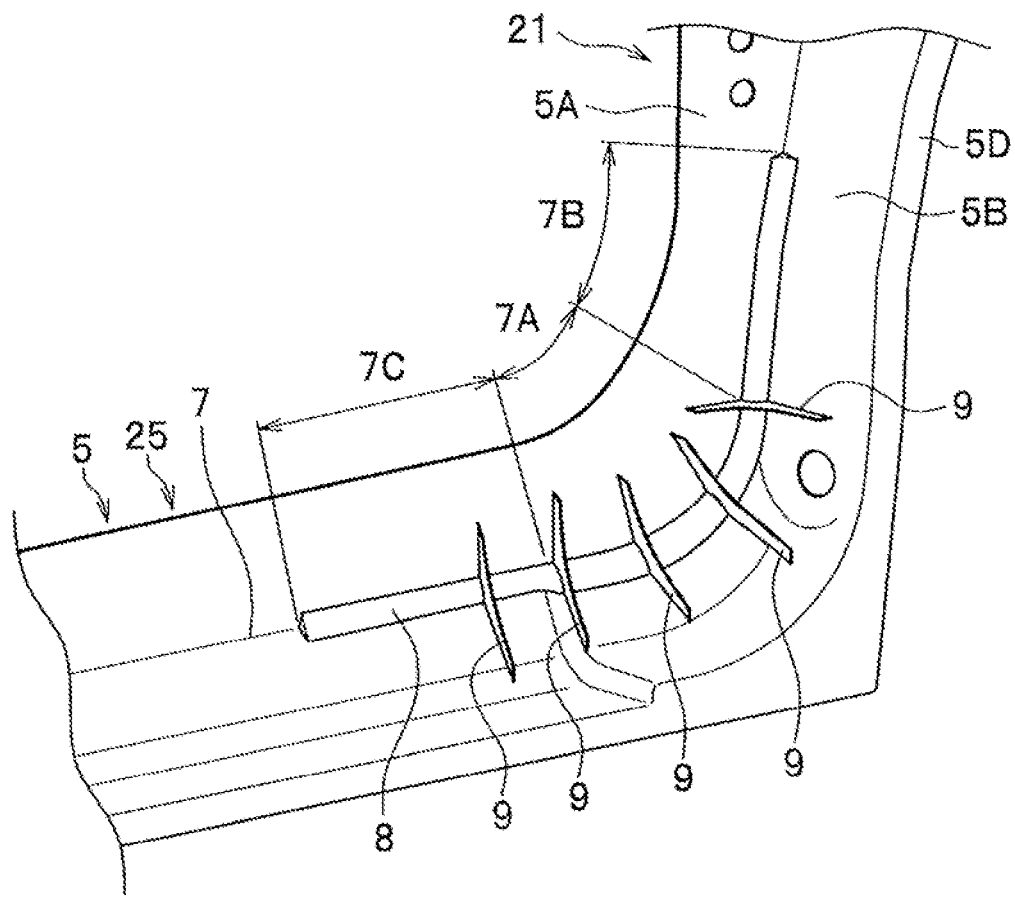
FIG. 3 is a perspective view, as viewed from the vehicle interior side, of the side panel around a corner between a front pillar and a side sill.

A description is to be given of an embodiment in which the present invention is applied to a side panel to compose a side portion of a vehicle body. The side panel 1 is configured to include an inner panel 2, as shown in FIG. 1, and an outer panel 3 provided outside the inner panel 2, as shown in FIG. 2. Both the inner panel 2 and the outer panel 3 are made of a metal plate formed by press molding. Note that the outer panel 3 is not shown in FIG. 1, for the purpose of drawing.

In FIG. 1, the inner panel 2 includes a front inner pillar 21 that extends vertically on a front lateral side, a center inner pillar 22 that extends vertically on a center lateral side, a rear inner pillar 23 that extends vertically on a rear lateral side, a roof side inner rail 24 that extends horizontally on an upper lateral side, and a side inner sill 25 that extends horizontally on a lower lateral side. The inner pillars 21 to 23, the inner rail 24, and the inner sill 25 are joined, on the outer sides thereof, to the outer panel 3 that substantially follows the outer shape of the inner panel 2 in a side view. This makes the side panel 1 formed with a front pillar 11 to form a vertical framework on the front lateral side, a center pillar 12 to form a vertical framework on the center lateral side, a rear pillar 13 to form a vertical framework on the rear lateral side, a roof side rail 14 to form a horizontal framework on the upper lateral side, and a side sill 15 to form a horizontal framework on the lower lateral side.

The front pillar 11, the center pillar 12, a front portion of the roof side rail 14, and a front portion of the side sill 15 form a front opening 16 for a front door. The center pillar 12, the rear pillar 13, a rear portion of the roof side rail 14, and a rear portion of the side sill 15 form a rear opening 17 for a rear door.

As shown in FIG. 2, the inner panel 2 is configured to include a side inner panel 4 and a reinforcing inner panel 5. FIG. 2 is a cross-sectional view of the front inner pillar 21, and the inner panel 2 is configured to include the side inner panel 4 and the reinforcing inner panel 5 also in other parts such as the center inner pillar 22, the rear inner pillar 23, the roof side inner rail 24, and the side inner sill 25.

In FIG. 2, the side inner panel 4 is formed substantially along the vehicle front-rear direction, to have a flange 4A on the front edge, serving as an outer edge of the front opening 16, and a flange 4B on the rear edge, serving as an inner edge of the front opening 16. The reinforcing inner panel 5 is disposed on the vehicle exterior side of the side inner panel 4. The reinforcing inner panel 5 is formed to include: a first surface 5A formed on the vehicle exterior side of the side inner panel 4 at a distance therefrom, along the vehicle front-rear direction; a second surface 5B extending inward in the vehicle width direction from a front edge of the first surface 5A so as to intersect the first surface 5A; a third surface 5C extending inward in the vehicle width direction from a rear edge of the first surface 5A so as to intersect the first surface 5A; a flange 5D extending forward from an inner end on the vehicle interior side of the second surface 5B to contact the flange 4A; and a flange 5E extending rearward from an inner end on the vehicle interior side of the third surface 5C to contact the flange 4B.

The outer panel 3 has a shape generally following the reinforcing inner panel 5, and is formed to include a side surface 3A formed substantially along the first surface 5A, a front surface 3B formed substantially along the second surface 5B, a rear surface 3C formed substantially along the third surface 5C, a flange 3D extending forward from an inner end on the vehicle interior side of the front surface 3B to contact the flange 5D, and a flange 3E extending rearward from an inner end on the vehicle interior side of the rear surface 3C to contact the flange 5E. The side inner panel 4, the reinforcing inner panel 5, and the outer panel 3 are joined together by spot welding, with the flange 4A, the flange 5D, and the flange 3D overlapped with each other, and also with the flange 4B, the flange 5E, and the flange 3E overlapped with each other. A space 6 having a closed cross-section is defined between the side inner panel 4 and the reinforcing inner panel 5. The space 6 having a closed cross-section is also defined by the center inner pillar 22, the rear inner pillar 23, the roof side inner rail 24, and the side inner sill 25, although there are differences in shape.

FIG. 3 is a perspective view, as viewed from the vehicle interior side, of the reinforcing inner panel 5 around a front lower corner thereof, in other words, around a corner between the front inner pillar 21, which extends vertically in the reinforcing inner panel 5 to form a first side of the front opening 16, and the side inner sill 25, which extends in the front-rear direction so as to intersect the front inner pillar 21 to form a second side of the front opening 16. The third surface 5C in FIG. 2 is not shown in FIG. 3, for the purpose of drawing.

In FIG. 3, the first surface 5A and the second surface 5B are each continuously formed from the front inner pillar 21 to the side inner sill 25 through a corner thereof. Accordingly, a surface edge 7 between the first surface 5A and the second surface 5B is also continuously formed from the front inner pillar 21 to the side inner sill 25. A thickening part 8 made of metal, for partial thickening by a thickening process, is provided on the vehicle interior side (in the internal corner) of the surface edge 7.

An example of the thickening process is a metal 3D printing method, and other examples include a metal spraying method and a cold spray method. The metal 3D printing method includes a powder metal laminating method to irradiate spread metal powder with laser beams for sintering to produce a shaped object, a molten metal lamination method to melt a metal wire into droplets by arc discharge or the like to produce a shaped object, and a powder metal lamination welding method to laminate powder metals for welding.

The thickening part 8 is continuously formed from the front inner pillar 21 to the side inner sill 25. That is, the thickening part 8 is continuously formed along the surface edge 7 to include a curved range 7A, a partial linear range 7B to continue from one end of the curved range 7A onto the front pillar inner 21, and a partial linear range 7C to continue from the other end of the curved range 7A onto the side inner sill 25.

Figure 4:
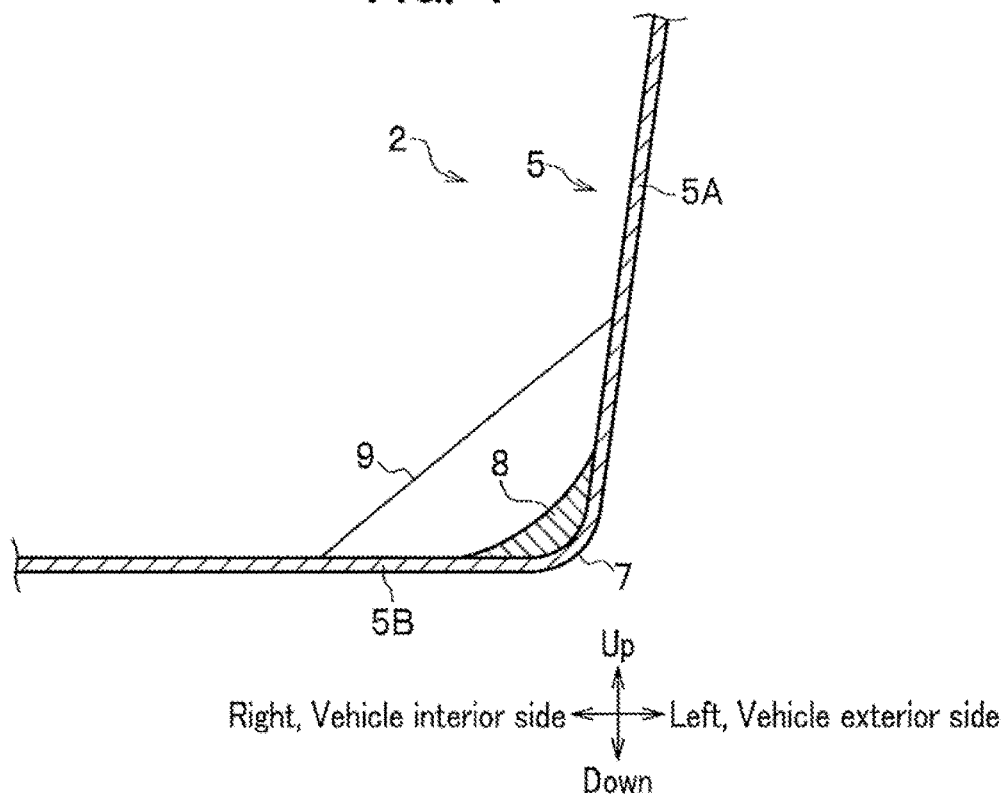
FIG. 4 is a cross-sectional view of a thickening part.
Figure 5:
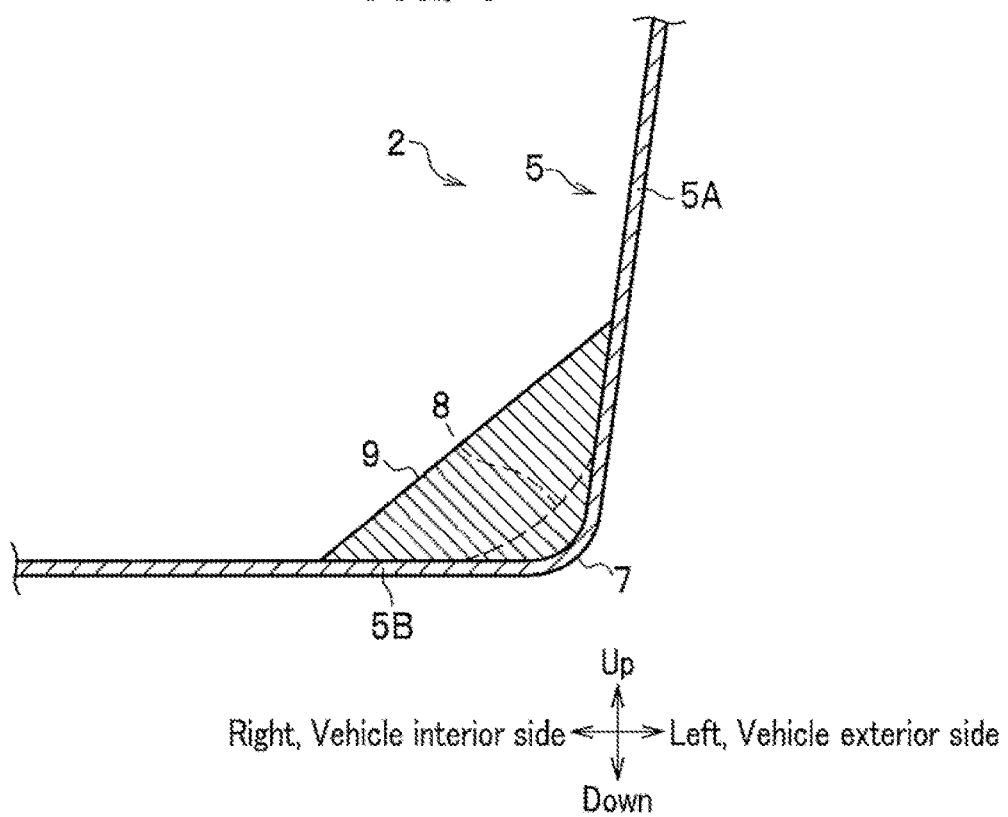
FIG. 5 is a s cross-sectional view of a thickening rib part.

The thickening part 8 is formed to fill the vehicle interior side of the surface edge 7 to have a substantially triangular cross-sectional shape, for example, having the first surface 5A and the second surface 5B as two sides, as shown in FIG. 4. In the present embodiment, a thickening rib part 9 in a rib shape formed over the first surface 5A and the second surface 5B is provided in addition to the thickening part 8, as shown in FIG. 5. The thickening rib part 9 has a substantially triangular cross-sectional shape larger than the cross section of the thickening part 8, having the first surface 5A and the second surface 5B as two sides. The thickening rib part 9 is formed in a thin plate shape along a plane orthogonal to the first surface 5A and the second surface 5B, and a plurality of the thickening rib parts 9 are formed at intervals in the curved range 7A and the partial linear ranges 7B, 7C, along the surface edge 7.

As described above, when the panel to be arranged in the vehicle body is configured to include the inner panel 2, as a metal main body, formed by press molding, and the thickening part 8 to partially thicken the inner panel 2 by the thickening process, only a portion or portions of the penel requiring reinforcement is/are easily thickened by the thickening process to suppress the vehicle body from having an increased weight as compared with a structure of another press-molded panel being overlappingly attached for reinforcement. As the thickening process is executed after the inner panel 2 being press-molded, the process is free from impairing press-molding of the inner panel 2.

When the inner panel 2 as a main body is configured to include: the first surface 5A; the second surface 5B extending in a direction to intersect the first surface 5A; and the surface edge 7 between the first surface 5A and the second surface 5B, as well as the thickening part 8 is provided along the surface edge 7, the following effects are exhibited. The inner panel 2 formed by press molding, when an external force is applied thereto, is capable of strongly keeping rigidity of shape, while the shape of the surface edge 7 (the intersection angle between the first surface 5A and the second surface 5B across the surface edge 7, for example) is maintained, but once the shape of the surface edge 7 collapses with a larger external force being applied, the inner panel 2 would easily start being deformed. In contrast, thickening the surface edge 7 suppresses the surface edge 7 from being collapsed, to suppress the inner panel 2 from being deformed.

When the panel is the inner panel 2 to form at least a part of the front opening 16 of the vehicle body, the front opening 16 includes the front inner pillar 21 as the first side and the side inner sill 25 as the second side extending in a direction to intersect the front inner pillar 21, the surface edge 7 is formed to continue from the front inner pillar 21 to the side inner sill 25, and the thickening part 8 is also formed to continue from the front inner pillar 21 to the side inner sill 25, corner portions of the front opening 16, where the load during the vehicle traveling, and the like concentrate, can effectively be reinforced.

When the inner panel 2 as a main body includes the first surface 5A and the second surface 5B extending in a direction to intersect the first surface 5A, and is configured to include the thickening rib portions 9 in a rib shape formed over the first surface 5A and the second surface 5B, widening deformation of a crossing angle between the first surface 5A and the second surface 5B being increased, or collapsing deformation of the crossing angle being decreased is suppressed more effectively.

When the panel provided with the thickening part 8 or the thickening rib part 9 is the inner panel 2 disposed inside the outer panel 3 forming the outer surface of the vehicle body, the following advantages are gained. Thickening process may have a risk of making minute distortion or the like in a press-molded metal panel, but the thickening process is executed herein on the inner panel 2 disposed inside the outer panel 3, to prevent the outer panel 3 serving as a design surface from having deterioration of the appearance.

When a method of manufacturing a panel to be arranged in a vehicle body includes a press molding step to mold the inner panel 2 as a metal main body by press molding, and a thickening step to partially thicken the inner panel 2 by a thickening process, only a portion or portions of the panel requiring reinforcement is/are easily thickened by the thickening process to suppress the vehicle body from having an increased weight as compared with a structure of another press-molded panel being overlappingly attached for reinforcement. As the thickening process is executed after the inner panel 2 being press-molded, the process is free from impairing press-molding of the inner panel 2.

When the manufacturing method of the vehicle panel press-molds the inner panel 2 in the press molding step so as to include: the first surface 5A; the second surface 5B extending in a direction to intersect the first surface 5A; and the surface edge 7 between the first surface 5A and the second surface 5B, and thickens the inner panel 2 along the surface edge 7 in the thickening step, the following effects are exhibited. The inner panel 2 formed by press molding, when an external force is applied thereto, is capable of strongly keeping rigidity of shape, while the shape of the surface edge 7 (e.g., the intersection angle between the first surface 5A and the second surface 5B across the surface edge 7) is maintained, but once the shape of the surface edge 7 collapses with a larger external force being applied, the inner panel 2 would easily start being deformed. In contrast, thickening the surface edge 7 suppresses the surface edge 7 from being collapsed, to suppress the inner panel 2 from being deformed.

Hereinabove, the preferred embodiment of the present invention has been described. The corner of the opening subjected to the thickening process is not limited to the corner between the front pillar 11 and the side sill 15. For example, as for the front opening 16, the thickening part 8 may be provided at a corner between the center pillar 12 and the roof side rail 14 or a corner between the center pillar 12 and the side sill 15. As for the rear opening 17, the thickening part 8 may be provided at a corner between the center pillar 12 and the roof side rail 14, a corner between the center pillar 12 and the side sill 15, or a corner between the roof side rail 14 and the rear pillar 13.

Only one of the thickening part 8 and the thickening rib part 9 may be provided. Depending on the situation, the outer panel 3 may be subjected to a thickening process.

LEGEND FOR REFERENCE NUMERALS

1 Side panel, 2 Inner panel, 3 Outer panel, 4 Side inner panel, 5 Reinforcing inner panel, 5A First surface, 5B Second surface, 6 Space having a closed cross-section, 7 Surface edge, 8 Thickening part, 9 Thickening rib part, 11 Front pillar, 12 Center pillar, 13 Rear pillar, 14 Roof side rail, 15 Side sill, 16 Front opening, 17 Rear opening.

The invention claimed is:

1. A panel for a vehicle to be arranged in a vehicle body, comprising:
    a main body made of metal and formed by press molding; and
    a thickening part to partially thicken the main body by a thickening process,
    wherein the main body is formed to have a first surface, a second surface extending in a direction to intersect the first surface, and a surface edge between the first surface and the second surface,
    the thickening part includes a first thickening part provided continuously along the surface edge, and second thickening parts in a rib shape, each formed into a thin plate extending along a plane orthogonal to the first and second surfaces and having a triangular cross section larger than a cross section of the first thickening part, as viewed along the surface edge, and
    the second thickening parts are provided so as to intersect the first thickening part, and are formed at intervals along the surface edge.

2. The panel for a vehicle as claimed in claim 1, wherein the panel is one to form at least a part of an opening of the vehicle body, wherein the opening includes a first side, and a second side extending in a direction to intersect the first side,
    the surface edge is formed to continue from the first side to the second side, and
    the first thickening part is formed to continue from the first side to the second side.

3. The panel for a vehicle as claimed in claim 1, wherein the panel is an inner panel disposed inside an outer panel forming an outer surface of the vehicle body.

4. A method of manufacturing a panel for a vehicle to be arranged in a vehicle body, the method comprising:
    press molding a main body of a panel, which is made of metal, by press molding; and
    partially thickening the main body to have a thickening part,
    wherein
    the main body is formed to have a first surface, a second surface extending in a direction to intersect the first surface, and a surface edge between the first surface and the second surface, and
    the thickening part includes a first thickening part provided continuously along the surface edge, and second thickening parts in a rib shape, each formed into a thin plate extending along a plane orthogonal to the first and second surfaces and having a triangular cross section larger than a cross section of the first thickening part, as viewed along the surface edge,
    wherein the second thickening parts are provided so as to intersect the first thickening part, at are formed intervals along the surface edge.

* * * * *